(12) United States Patent
Wallace, Jr. et al.

(10) Patent No.: US 6,601,169 B2
(45) Date of Patent: Jul. 29, 2003

(54) KEY-BASED SECURE NETWORK USER STATES

(76) Inventors: Clyde Riley Wallace, Jr., 5412 Savoy Ct., Cape Coral, FL (US) 33904; Timothy Mark Thompson, 4523 SE. $6^{th}$ Pl., Cape Coral, FL (US) 33904

( * ) Notice: Subject to any disclaimer, the term of this patent is extended or adjusted under 35 U.S.C. 154(b) by 153 days.

(21) Appl. No.: 10/003,736

(22) Filed: Oct. 31, 2001

(65) Prior Publication Data

US 2002/0152378 A1 Oct. 17, 2002

Related U.S. Application Data

(63) Continuation of application No. 09/545,009, filed on Apr. 7, 2000, which is a continuation of application No. 09/475,638, filed on Dec. 30, 1999, now abandoned.

(51) Int. Cl.$^7$ ................................................. G06F 1/24
(52) U.S. Cl. ........................................ 713/151; 713/168
(58) Field of Search ................................ 713/151, 161, 713/164, 166, 168

(56) References Cited

U.S. PATENT DOCUMENTS 5,822,314 A * 10/1998 Chater-Lea ................. 370/337
5,822,676 A * 10/1998 Hayashi et al. ............... 455/4.2
5,864,843 A * 1/1999 Carino, Jr. et al. ............ 707/4
5,919,289 A * 7/1999 Misawa et al. ............... 96/203

* cited by examiner

Primary Examiner—Thomas R. Peeso (57) ABSTRACT

A server and a computer are connected to a network. User data may be used to establish a state between a server and a user operating the computer. Key-based secure network user states includes encrypting user data with a cryptographic key; embedding, into the encrypted user data, the cryptographic key or reference data associated with the cryptographic key; storing the encrypted user data with embedded key data in a cookie; and sending the cookie to a computer; such that subsequently, a secure state between the server and the user is established by receiving the cookie from the computer; extracting, from the cookie, the encrypted user data and embedded key data; decrypting, using said key data, the encrypted user data; and establishing the secure state between the server and the user based on the decrypted user data. Key data is the cryptographic key or reference data for obtaining the cryptographic key.

19 Claims, 8 Drawing Sheets

$i \geq 1, j \geq 1$

Fig. 3 cookie $m \geq k$

KEY-BASED SECURE NETWORK USER STATES

CONTINUING DATA

This is a CONTINUATION of, and incorporates by reference in its entirety, U.S. application Ser. No. 09/545,009, entitled SECURE INTERNET USER STATE CREATION METHOD AND SYSTEM WITH USER SUPPLIED KEY AND SEEDING and filed on Apr. 7, 2000 by Wallace, which in turn is a CONTINUATION of, and incorporates in its entirety, U.S. application Ser. No. 09/475,638 entitled METHOD AND SYSTEM FOR CREATING SECURE INTERNET USER STATES, filed on Dec. 30, 1999 by Wallace et. al. Further, this disclosure is related to, and incorporates by reference in their entireties, U.S. application Ser. No. 09/491,225 entitled KEY-BASED METHOD AND SYSTEM FOR CREATING SECURE INTERNET USER STATES, and Ser. No. 09/491,059 entitled KEY-BASED METHOD AND SYSTEM WITH KEY INDEX FOR CREATING SECURE INTERNET USER STATES, both filed on Jan. 25, 2000 by Wallace et. al, and now abandoned; and U.S. application Ser. No. xx/xxx,xxx entitled SECURE NETWORK USER STATES filed on Oct. 31, 2001 by Wallace.

FIELD OF INVENTION

The present invention relates to key-based secure network user states.

BACKGROUND OF THE INVENTION

Computer networks, such as the Internet, are well known in the art, and may be based on the HTTP protocol. Because HTTP is a stateless, or non-persistent, protocol, it is not possible for such servers to differentiate between visits by a specific user unless the server can somehow mark the user to create a state or logical nexus between the server and the user. Thus, each visit by an Internet user to a website is unique, in that the website does not generally know the identity of the user and/or other information about the user, with the exception of a few details such as browser type, IP address, etc. It should be noted, however, that when a user has a fixed IP address, the user's identity or information about the user may be known by logical relation to a database. But, since the majority of Internet users are assigned dynamic IP addresses each time they connect to the Internet, reliance on a user's IP address to create a state is problematic since their IP addresses may change each time a user connects to the Internet.

To remedy the problem of HTTP's stateless nature, cookies have been introduced for the specific purpose of creating states. They may be temporary, in which case they are stored only in memory; or persistent, in which case they are stored in a file, typically on a hard drive, for period of time measured by an expiration date field of a cookie. A cookie may be thought of as a data structure stored in the memory or on the storage device of a user's computer, with the cookie containing data, such as the user's identity and/or other information about the user for the purpose of creating a state between the web server and the user. Thus, when a user visits a particular website, a cookie stored on a user's computer may be sent from the user's computer over the Internet to the web server, which then extracts the data from the cookie, processes the data and therewith creates a state. For example, a user's name may be stored in a cookie and when that user visits a particular website, the data contained in the cookie may be sent to the server and used to identify the user.

More specifically and typically, when a user first visits an Internet website, a web server associated with the website may send a cookie to the user, which is then stored in the memory or on the hard drive of a user's computer, in conjunction with the user's Internet browser software. When the user subsequently visits the website, the cookie may be sent back to the server so that the user's identity and/or other information about the user that is stored in the cookie may be known to the server via the data contained in the cookie, such that a state between the user and the web server is created.

However, the use of cookies has created a significant problem relating to user privacy. Because these cookies are stored on a user's computer, especially when on a hard drive, other servers may potentially access the cookies of other servers and extract and read the user's identity and/or other information about the user that is stored in those cookies. Such extracting and reading is considered by many as an invasion of the user's privacy.

An attempted solution to protect the privacy of Internet users is provided in RFC 2109, HTTP STATE MANAGEMENT MECHANISM, having a publication date of February, 1997. This solution involves a domain restriction on reading and writing cookies, which must be implemented in conjunction with a user's particular browser software for effectuation. For example, a web server associated with the domain thissite.com may write a cookie having the domain value .thissite.com. According to the domain restriction, this cookie may only be read by a server within the specified domain and related sub-domains. For example, while the servers at thissite.com, L1.thissite.com, L2.L1.thissite.com, etc. may read the cookie having the domain value .thissite.com, the servers othersite.com, L1.othersite.com, L2.L1.othersite.com may not read the cookie having the domain value .thissite.com. While this methodology appears adequate on its face, practically it is not. It suffers from at least four deficiencies.

A first problem is that this methodology requires software vendors producing browser software to implement this domain restriction. While mainstream vendors may attempt to comply, other smaller vendors may not. Thus, failed compliance may create a hole through which a user's privacy may be invaded via the unauthorized access of cookies despite the existence of a domain restriction.

A second problem is that despite attempted compliance, one or more bugs or exploits in the browser software may exist and be exploited; thus, also creating a hole through which a user's privacy may be invaded. For example, as identified in the article, COOKIE EXPLOIT, published by COOKIE CENTRAL™ on Dec. 14, 1998, such a bug did exist and a hole was potentially created and exploited. The bug allowed cookies to be shared between unrelated domains, despite the domain restriction implemented by some if not all cookie-based Internet browser applications. Basically, by concatenating an ellipsis (" . . . ") at the end of the domain value set in a cookie, other unrelated servers were able to read those cookies. Such a domain value may be ".thissite.com . . . " According to this article, at the time of publication all mainstream Internet browser applications were vulnerable to this exploit. Indeed, the article goes on to assert that the most popular Internet browser applications, INTERNET EXPLORER and NETSCAPE, were known to be vulnerable on the WINDOWS, MAC and LINUX platforms. Thus, the domain restriction was nullified and servers participating in the exploitation of this bug were able to access cookies from domains outside their own domain, which is exactly what the domain restriction of RFC 2109 was intended to prevent. Thus, the privacy of Internet users benefiting from the use of cookies was unequivocally subject to invasion.

A third problem is that the cookies stored on a user's hard drive may be viewed by a person who is physically using the user's computer. The location and naming of cookie files stored on a user's hard drive are generally known or discoverable by those skilled in the art. For example, it is well known in the art that the browser software application NETSCAPE™ that is developed and distributed by NETSCAPE COMMUNICATIONS CORPORATION™ generally stores cookies in a user directory in a single file named "cookie.txt". One physically using a user's computer may open such a file with a simple text editor and directly view and/or print the data contained in all cookies present, which is clearly an invasion of the user's privacy.

A fourth problem is that under certain conditions servers may directly read cookie files outside the domain restriction set in the cookies. It is generally known in the art that where a user's Internet browser software is configured to enable JAVA script, specific files having a known name (such as, "cookies.txt") may be directly accessed, read and transmitted to some location over the Internet by a "virus" embedded within such JAVA script. Additionally, a devious program may also contain such a virus that can do the same. Many Internet users download and run executable programs from the Internet knowingly and unknowingly risking the infection of a virus; and therefore, this risk is present and real. The location of cookie files are generally known or discoverable to those ordinarily skilled in the art. Indeed, such a virus may execute a "directory" command to obtain the names of files and directories on a hard drive; for example, a directory listing of files and directories in the "c:\windows\Temporary Internet Files" directory or "c:\Program Files\Netscape\Users" directory. The former may produce cookie files produced by INTERNET EXPLORER; while the latter may produce the names of the directories of users of NETSCAPE (i.e., John), which may be used to access the NETSCAPE cookie file, which in this case would be "c:\Program Files\Netscape\Users\John\cookies.txt". Indeed, the surreptitious harvesting of cookies files is available to those seeking it; and the privacy of Internet users are subject to invasion.

Another attempted solution is practiced by some industry participants. This attempted solution involves storing in persistent cookies a primary key (or database index) to a database containing data records of user information, rather than storing the private data in the persistent cookies. Thus, the unauthorized viewing or reading of a primary key does not appear to be an invasion of privacy. While some, including the public, may consider such a practice as sufficient in protecting user privacy from invasion, practically it is insufficient and provides a false sense of security.

By definition, primary keys are unique within a defined universe. Thus, within a defined universe of Internet users, a single primary key uniquely identifies one or more database records that relate to a specific user. Where the contents of a database are known or obtained by a party (i.e., possessed, or hacked into and harvested), an Internet user, within the defined universe, visiting a website associated with that party risks an invasion of privacy. If the user has a primary key stored in a persistent cookie on the user's hard drive, access to that cookie may allow information relating to the user in the database to be referenced and used by the party to establish an undesired state between the website and the user. In addition, other information about the user that may be harvested during the visit from other cookies stored on the user's hard drive may be combined with the user's data in the database. For example, the database may only contain the user's name, address and phone number. But data harvested from the user's other cookies may reveal that the user had visited a website associated with herbal treatments for those with HIV, a website associated with HIV treatment centers in the user's town and a website associated with HIV research. By combining this health-related data with the database data, the name, address and phone number of a person who appears to have HIV is now known. Where the person does in fact have HIV and sought to keep his or her ailment private, this combined information results in the person's privacy being clearly invaded.

Therefore, there is a need for key-based secure network user states.

SUMMARY OF THE INVENTION

An object of the present invention is to provide key-based secure network user states.

Another object of the present invention is to provide key-based secure network user states that assist in minimizing at least one of the problems mentioned above.

The environment of the present invention includes at least one server and at least one computer communicatively connected together via an HTTP-based network, where user data is used to establish a state between a server and a user operating a computer.

In an exemplary aspect of the invention, a method of establishing by a server a secure state between the server and a user operating a computer, includes encrypting user data with a cryptographic key; embedding, into the encrypted user data, the cryptographic key or reference data associated with the cryptographic key; storing the encrypted user data with embedded key data in a cookie; and sending the cookie to a computer; such that subsequently, a secure state between the server and the user is established by receiving the cookie from the computer; extracting, from the cookie, the encrypted user data and embedded key data; decrypting, using said key data, the encrypted user data; and establishing the secure state between the server and the user based on the decrypted user data.

In another exemplary aspect of the invention, reference data is an index, pointer or seed, with which a particular cryptographic key may be obtained (e.g., referenced, accessed, generated, etc.).

Other features and advantages of the present invention will be apparent from the accompanying drawings and the detailed description that follows.

BRIEF DESCRIPTION OF THE DRAWINGS

The present invention is illustrated by way of example and not limitation in the figures of the accompanying drawings in which like references indicate similar elements and in which.

DETAILED DESCRIPTION

Figure 1:
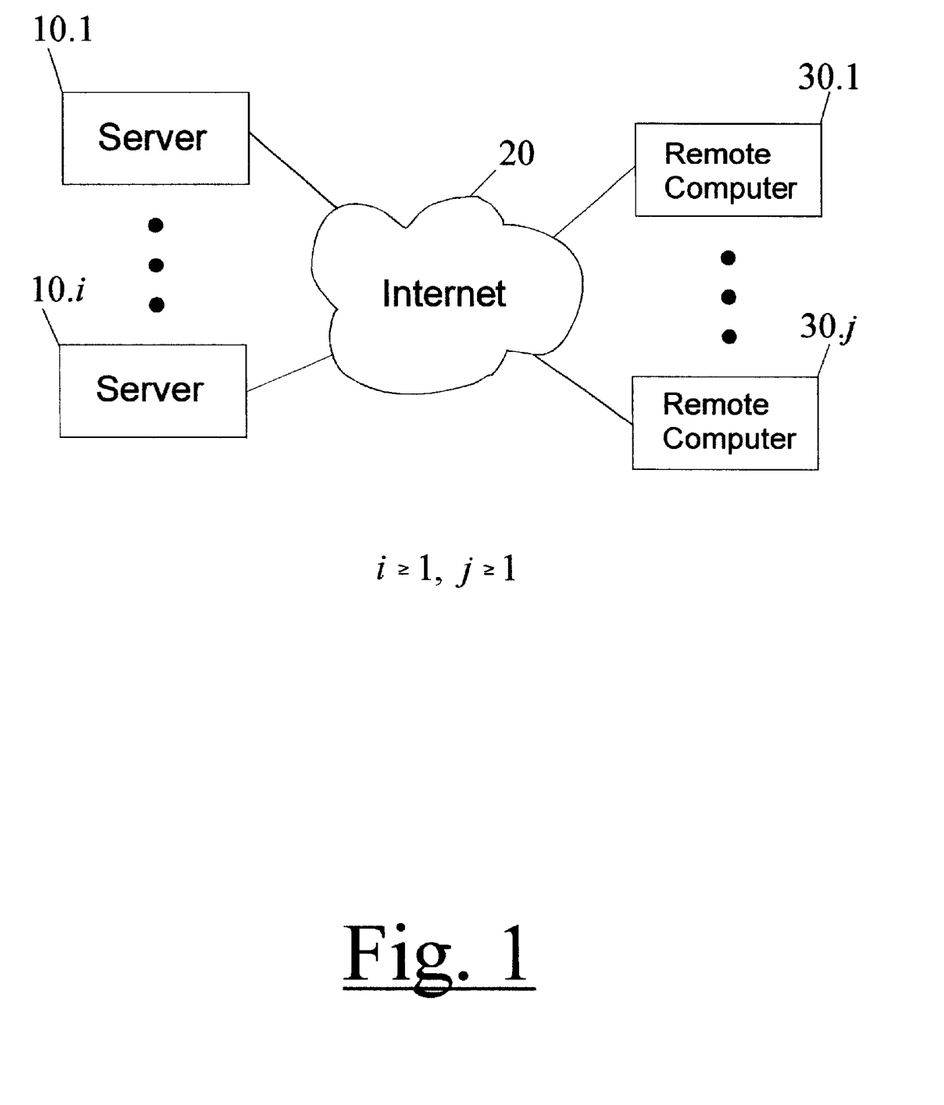
FIG. 1 shows the general environment of the present invention, in which one or more servers are connected to one or more remote computers via the Internet or other HTTP-based network.

FIG. 1 shows the environment of the present invention, in which one or more servers 10.1–10.a (for a≧1) are operatively connected via the Internet 20 (or other network) to one or more remote computers 30.1–30.b (for b≧1).

Generally, the present invention is carried out via software executing on one or more servers, software executing on one or more remote computers, and user input via one or more input devices operably connected to a user's remote computer.

The private data (or "user data") of a user is herein broadly defined. This includes the user's IP address, name, mailing address, email address, age, sex, credit card information, login/password combinations, preferences, hobbies, education level, browsing (click) history, browsing history with click frequency, browsing preferences, assigned primary keys, assigned GUIDs, etc. In essence, private data relating to a user includes any information that may in and of itself be personal and private, as well as information that may be personal and private when combined with other data relating to the user. Thus, any data particular to a user may be considered private data.

In an exemplary aspect of the invention, a remote computer comprises an operable Internet connection, Internet software, one or more computer memories for readably storing said Internet software, one or more input devices and a CPU for executing said Internet software, wherein said computer Internet connection, each of said one or more computer memories, each of said one or more input devices and said computer CPU are operatively connected to each other by at least one bus. Preferably, a remote computer has at least two computer memories: RAM and a hard drive; and at least two input devices: a pointing device and a keyboard.

In a further exemplary aspect of the invention, a server comprises an operable Internet connection, one or more server memories for readably storing server software and cryptography software, and a CPU for executing said server software and said cryptography software, wherein said server CPU, each of said server memories and said server Internet connection are operatively connected to each other by at least one bus. Preferably, a server has at least two server memories: RAM and a hard drive. However, since software may be stored solely in RAM, the required software may be loaded into RAM from a removable storage device (e.g., hard drive) or storage medium (e.g., diskette or data cartridge), with the device or medium subsequently being removed.

The server software and cryptography software executing on a server may be implemented with any compatible programming language and/or script that functionally effectuates the present invention as claimed.

The cryptography software according to the present invention may perform encryption and/or decryption. Generally, the cryptography software performs both encryption and decryption; however, where a first server only encrypts data and other related servers decrypt data, cryptography software need not perform both. The cryptography software may utilize any key-based encryption algorithm, or combination of algorithms in whole or in part, known in, taught by or apparent in light of the prior art that effectuates the present invention as claimed. However, it is essential that the overall functionality of the encryption algorithm used is one-to-one, in that the initial data results from decryption of an encrypted format of the initial data. An illustrative set of example prior art encryption algorithms and techniques from which one may draw one or more, in whole or in part, in effectuating the present invention are RSA; DSA; Diffie-Hellman; Public-Key Cryptography; PGP; Signature Algorithms; DES; triple-DES; IDEA; TDEA; Blowfish; Twofish; Yarrow; Square; TEA; CAST-128; RC4; Safer SK-128; Block Ciphers, including TWOFISH; Stream Ciphers; MD2, MD4, MD5 and other techniques based on the Secure Hash Standard (SHS) or Secure Hash Algorithm (SHA-1); Digital Timestamps Supporting Digital Signatures; Secret Sharing Schemes, including Blakley's Secret Sharing Scheme, Shamir's Secret Sharing Scheme and Visual Secret Sharing Schemes; Interactive Proofs; Zero-Knowledge Proofs; Message Authentication Codes; Quantum cryptography; and known or apparent variations and combinations thereof.

In a preferred embodiment, PUKALL's 128-bit stream cipher algorithm is used in effectuating the present invention, as it is known to execute with relatively great speed with small text-based data; was conveniently published by ALEXANDER PUKALL in 1991 (see http://www.multimania.com/cuisinons/pcl/index.html); and by its express terms, may be used freely even for commercial applications. Use of this algorithm is highly suggested because of its fast processing speed, high encryption strength (128-bit keys) and minimal cost (free).

According to the present invention, an encryption key is used to encrypt private data relating to the user. An encryption key may be any number of bits consistent with the particular encryption algorithm used. However, it is important to note that the larger the key size, the stronger the encryption. The most common sizes of encryption keys are evenly divisible by eight (e.g., 40bit, 56bit, 64bit, 80bit, 128bit, 160bit, 256bit, 512bit, 1024bit, etc.); however other sizes may be used to the extent desirable and consistent with the particular encryption algorithm used. In a preferred embodiment, 128bit encryption keys are used. The choice of which encryption algorithm/technique, variation or combination thereof to use, including the size of the keys utilized, will depend on a number of factors, each of which may vary for each application of the present invention. Such factors include speed of processing, strength of encryption and associated cost, including the cost of using and/or implementing the cryptography software (e.g., licensing fees, coding thereof). Such choice based on the criteria above will be apparent to one ordinarily skilled in the art. Further, more than one encryption key may be used for encrypting private data, such that a different key, or combination, may be used for each of two or more users.

In an exemplary embodiment of the invention, a key used to encrypt private data may be subsequently embedded within the encrypted private data to be stored in a cookie. Any embedding technique may be employed, as long as an embedded key may be subsequently extracted from the encrypted private data for decryption of the encrypted private data. For example, a key may be concatenated to the head of the encrypted data; inserted in the middle of the encrypted data; concatenated at the tail of the encrypted data; or distributed through the data symmetrically or asymmetrically. Further, the key may be embedded in its initial format or even hidden by first applying some form of coding and/or encryption. It is important to note that where keys are stored in the cookies, keys need not be stored on a server.

In an alternative embodiment of the present invention, reference data (e.g., an index, a pointer, a seed, etc.) associated with a key may be subsequently embedded within the encrypted private data to be stored in a cookie. While any type of reference data may be used with the present invention, a single lower case alphabetic character is preferred, as it resembles a typical character found in data encrypted with the PUKALL algorithm. Further, any embedding technique may be employed, as long as the embedded reference data may be subsequently extracted from the encrypted private data for obtaining the particular encryption key needed to decrypt the encrypted private data. For example, reference data may be concatenated to the head of the encrypted data; inserted in the middle of the encrypted data; concatenated to the tail of the encrypted data; or distributed through the data symmetrically or asymmetrically. Further, reference data may be embedded in its initial format or even hidden by first applying some form of coding or encryption. According to an exemplary embodiment of the invention, reference data may be an index assigned to the $9^{th}$ position of the encrypted private data, with the data initially at the $9^{th}$–$n^{th}$ position being shifted one position (i.e., here, one character place or 8 bits) to accommodate the insertion.

It is important to note that where a particular key used to encrypt private data is neither stored in a cookie nor derivable based thereon, that key must be stored, in some form, on the server, so that reference to the key may be effectuated with its associated reference data. For example, a set of 10 keys may be stored on the server either in RAM or on a storage device, with the keys being associated with reference data (e.g., an index).

According to a preferred embodiment, the lower case alphabetic characters d through m (d–m) may be conveniently used as indexes. Since the ASCII-based decimal values of these indexes are 100 through 109, respectively; the respective decimal values may be referenced and then the value 100 subtracted therefrom, respectively; resulting in indexes ranging from 0 to 9, with each index associated with one of the encryption keys. The encryption keys may be stored as an array of 16-character keys, with each key being referenced via one of the indexes.

For example, the lower case alphabetic character d has an ASCII-based decimal value of 100. Subtracting 100 from this value (100 minus 100) produces 0. The value 0 may then be used to reference a first encryption key in array containing 10 encryption keys.

Figure 2:
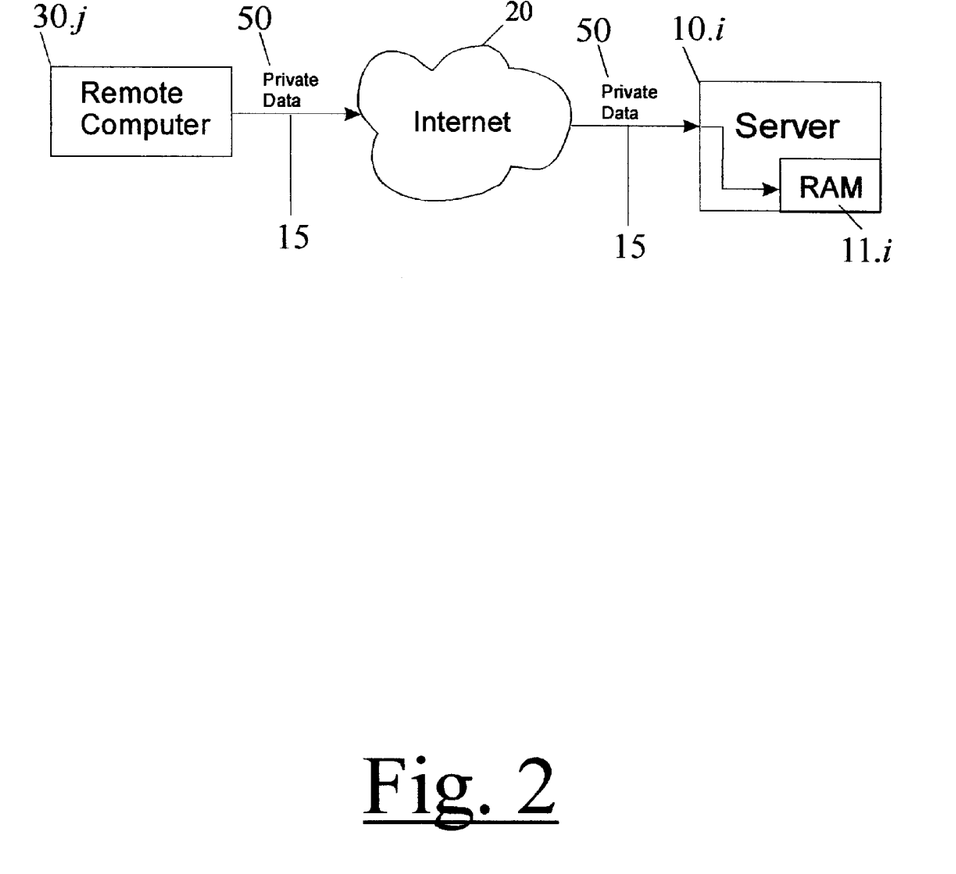
FIG. 2 shows the sending of private data by a remote computer over the Internet to a server according to the present invention.

The present invention is now described in operation:

As shown in FIG. 2, a user's computer may contact a server according to the present invention by sending a request for data, which may contain private data 50, via the user's computer 30.j over the Internet 20 to a server 10.i.

After receiving the private data 50, a server 10.i causes the data 50 to be stored in a memory 11.i (preferably RAM) for subsequent encryption. The user may contact a server by entering the URL or Internet address of the server or by clicking or selecting a bookmark or hyperlink directed to the server. Subsequently, the user may continue to enter private data 50 relating to the user, which may include any private data as previously defined, which may include filling out a form, via keyboard entry, displayed on a display device via browser software. Submitted form data may include name data, email address data, etc., which may be submitted via a submit button. Submitted form data may be posted to a CGI program or script, or similar program or script, located on the server via transmission over the Internet to the server.

As discussed above, the clicking history of a user, as that user peruses web pages, banners and/or links may also be considered private data. Thus, the submission of data may occur over one or more transactions and is not necessarily limited to submitted form data. Further, as expressly defined above, private data may be an assigned primary key; thus, the sending of private data by a user is not necessarily required by the present invention.

Private data of a user, in whole or in part, represents a state between the user and the server, and thus dictates, in whole or in part, the private data to be stored in a cookie by the server. For example, a user may send his last name, which may be "Gossage". Preferably, private data 50 may be transferred between the user's computer 30.j and server 10.i via a secured connection 15, such as SSL.

It should be noted that some precoding and decoding may be required with the particular encryption algorithm employed. For example, the private data may be concatenated in a particular order to form a string having fixed or variable length fields. Another form of coding is binary/text conversion, and may arise, for example, where a particular encryption algorithm/technique requires input data in binary format and the input data is initially in text format; and may also be optionally employed after output.

Any binary/text conversion and/or coding may be optionally employed prior to input, as well as subsequent to output, as long as one-to-one correspondence between the precoded and decoded data is preserved.

Figure 3:
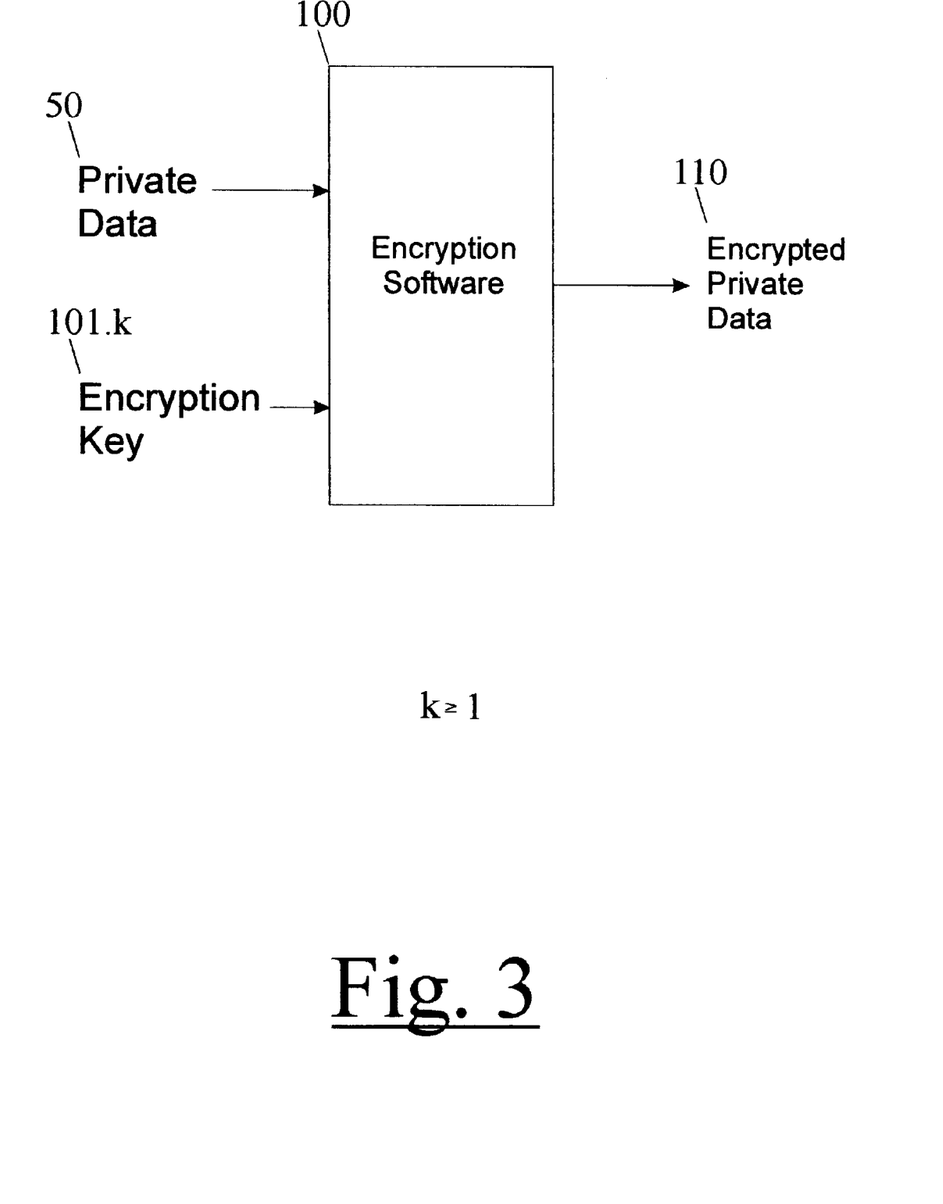
FIG. 3 shows the inputting of private data and a key into an encryption function to produce an encrypted format of the private data.

As shown in FIG. 3, encryption of private data 50 is effectuated by inputting the private data 50 and an encryption key 101.k (for k>1) into encryption function 100, which produces encrypted private data 110. And of course, where more than one encryption key is employed (for k>1), one or more keys may be selected in any desired way (e.g., random, sequential, etc.). According to an exemplary aspect, the PUKALL encryption algorithm accepts a 16-character string as a 256-bit key, such as the 16-character string "Remsaalps!123456". Encrypting the value "Gossage" with this key via the PUKALL algorithm may produce the value "¼M}7¿☐c÷☐".

Next, the encryption key or reference data associated with the encryption key is embedded into the encrypted private data prior to storage in a cookie. As described above, any known or apparent embedding technique may be employed as long as an embedded key or reference data may be subsequently extracted and used to decrypt the encrypted private data. For example, where the lower case character d (which may provide an index value 0) is associated with the encryption key "Remsaalps!123456", embedding the lower case character d into the encrypted private data may produce the value "¾M}7¿☐c÷d☐"; while an exemplary embedding of an encryption key into encrypted user data may produce the value "Remsaalps!123456¾M}7¿☐c÷☐".

There are six parameters that may be assigned to a cookie: (1) the name of the cookie, (2) the value of the cookie, (3) the expiration date of the cookie, (4) the path the cookie is valid for, (5) the domain the cookie is valid for, and (6) a flag representing the need for a secure connection to exist to use the cookie.

According to the present invention, the first two parameters must be explicitly assigned values: (1) the name of the cookie, and (2) the value of the cookie. The next four parameters may be optionally explicitly assigned values: (3) the expiration date of the cookie, (4) the path the cookie is valid for, (5) the domain the cookie is valid for, and (6) a flag representing the need for a secure connection to exist to use the cookie. These optional parameters may be explicitly assigned values to improve security and/or functionality, and are discussed in further detail herein.

Generally, creating a cookie involves replicating the HTTP cookie header in some fashion so that browser software executing on a remote computer will recognize and store the cookie.

According to the present invention, a cookie is named by assigning name data to the name field of a cookie, such as the name "ywi". Further, the encrypted private data with the embedded key or reference data is stored in the value field of a cookie.

The optional parameter (3), the expiration date of the cookie, may be assigned to the expires field of a cookie to direct browser software executing on a remote computer whether to store the cookie on a storage device, e.g., a hard drive. If not explicitly assigned a value, the expires field defaults to end-of-session and the browser preserves the cookie only in memory (RAM) until the browser session is closed. Such a value may be a past date, or a future date such as "Mon, 09-Dec-2002 13:46:00 GMT", which if processed prior to expiration, may be stored in a storage device. A resulting HTTP header representing this cookie may be as follows:

Content-type:
  text/html
Set-Cookie:
  ywi="¾M}7¿□c÷□"; path=/;
  expires=Mon, 09-Dec-2002 13:46:00 GMT Upon receiving this header, browser software executing on a remote computer may store the cookie to a storage device.

The optional parameter (4), the path the cookie is valid for, may be explicitly assigned a value, such as "/computerstore". This causes to be set the URL path the cookie is valid within. Thus, pages outside the path "/computerstore" cannot read or use the cookie having this value. Explicitly assigning a value to this parameter would be advantageous where multiple websites exist within a domain, such as www.thissite.com and www.thissite.com/otherparty, and sharing of cookies between the servers associated therewith is undesired. If not specified, the value defaults to the path of the document creating the cookie.

The optional parameter (5), the domain the cookie is valid for, may be explicitly assigned a value, such as ".thissite.com". Where a website uses multiple servers within a domain, it may be desirable to make the cookie accessible to pages on any of those servers. Thus, a cookie may be assigned to an individual server or to an entire Internet domain. Here, all servers within the domain www.thissite.com may access the cookie so defined. The default value if not explicitly set is the full domain of the document creating the cookie.

The optional parameter (6), a flag representing the need for a secure connection to exist to use the cookie, should only be used under a secure sever condition, such as SSL. Where secure transactions are implemented, this parameter heightens security between a server and a remote computer. If not explicitly set to TRUE, this defaults to FALSE.

In sending the cookie to a remote computer, the server effectuates the creation of an HTTP header which is sent along with a requested page. This causes the value of the cookie to be sent to a remote computer, received thereby, and in conjunction with browser software executing thereon, stored in memory or on a storage device, such as a hard drive.

Figure 4:
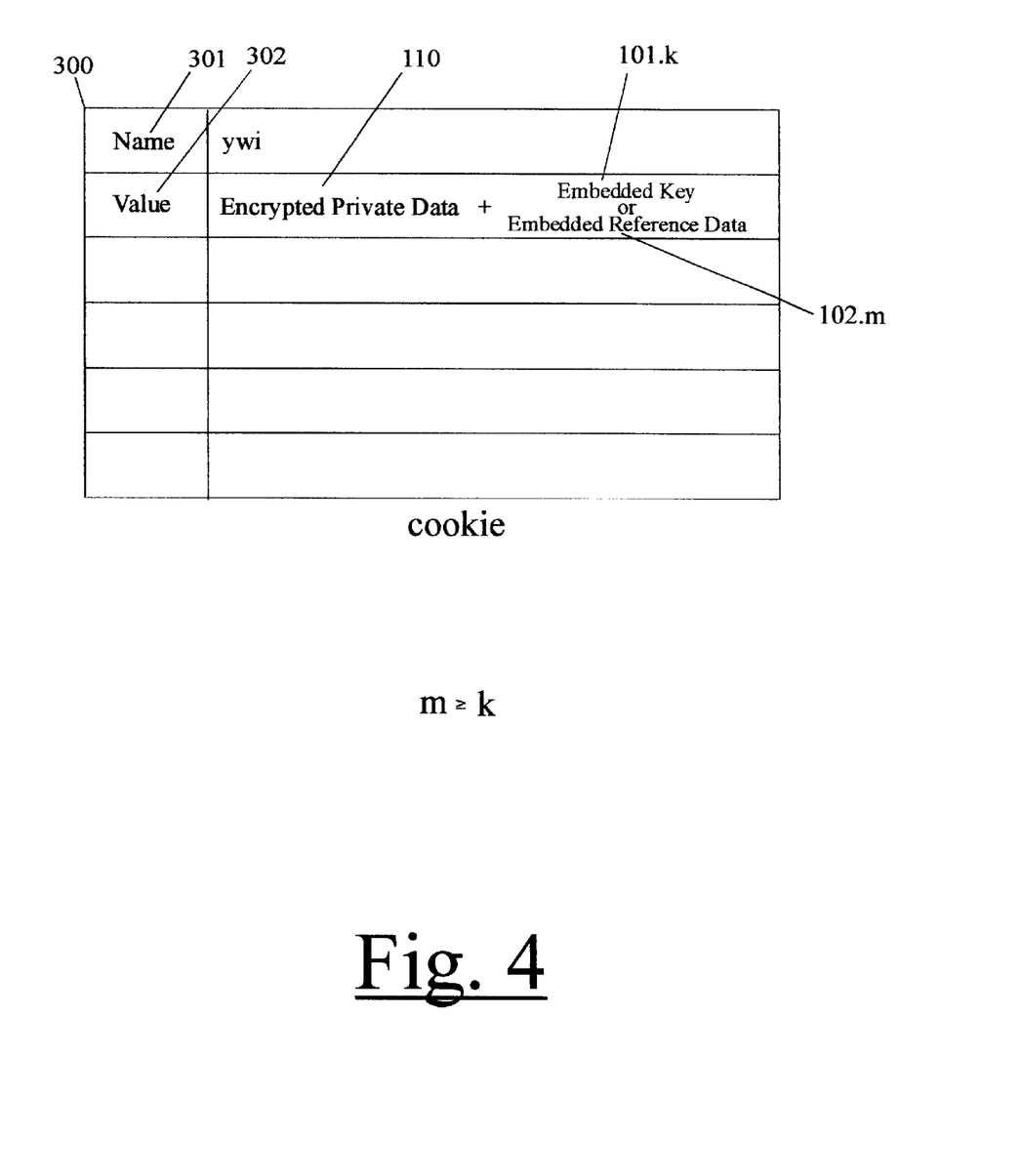
FIG. 4a shows encrypted private data and respective the cryptographic key stored in a cookie.
FIG. 4b shows encrypted private data and an index to the respective cryptographic key stored in a cookie.

As shown in FIG. 4, according to the present invention, a cookie 300 has at a minimum a name field 301 with a value representing the name of the cookie, such as "ywi". Further, the cookie 300 has a value field 302 containing the encrypted private data 110, with an embedded key 101.k or reference data 102.m.

It is important to note that cookies, as they are implemented today, are transferred between a server and a browser as an HTTP header and the specifications for this header are explicitly set forth in RFC 2109, which has been readily and freely available over the Internet. Further, the setting and reading of cookies can be effectuated with a plurality of languages and/or scripts, and the particular choice of language and/or script is not important to the present invention insofar as it does not deviate from the teachings of the invention. Examples of languages and scripts are as follows: JavaScript, PERL, LiveWire, ASP, Virtual Basic ("VB") and VBScript. Further, custom software may be used, via C, C++, etc., to the extent that a compatible HTTP header is created.

Figure 5A:
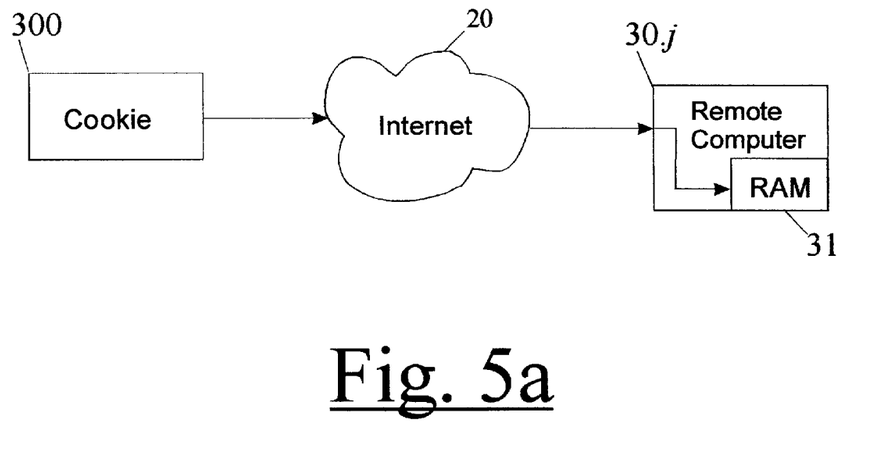
FIG. 5a shows a non-persistent cookie sent over the Internet to a remote computer that stores it in the remote computer's RAM.
Figure 5B:
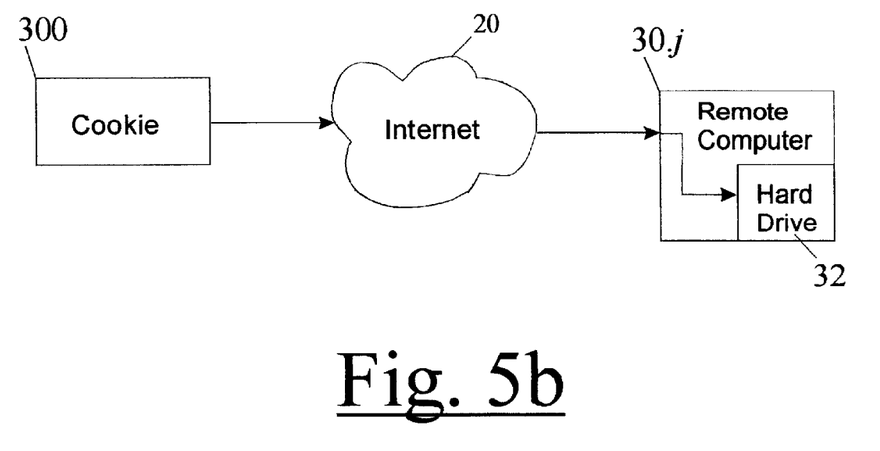
FIG. 5b shows a persistent cookie sent over the Internet to a remote computer that stores it on a hard drive.

As shown in FIGS. 5a and 5b, a cookie 300 is sent over the Internet 20 to a user's remote computer 30.j, which stores the cookie 300 in a read-write device, which may be the remote computer's RAM 31 or storage device 32, such as a hard drive.

When a user subsequently requests a page from the server or a related server, i.e., a request from the browser to a server, the cookie header is modified slightly from that which created the cookie. For example, the header may be as follows:

Content-type:
  text/html
Set-Cookie:
  ywi="¾M}7¿□÷d□"

Here, a server is made aware of the cookie named "ywi" having the value of the encrypted private data with embedded reference data. Generally, retrieving a cookie from a header does not require actual reading of the HTTP Cookie: header, since most languages automatically read this header for the programmer and make it accessible through a programming variable or object. As with creating a cookie, accessing a cookie may be effectuated with a plurality of languages and/or scripts, and the particular choice of language and/or script is not important to the present invention insofar as it does not deviate from the teachings of the present invention. Examples of languages and scripts are discussed above.

Figure 6A:
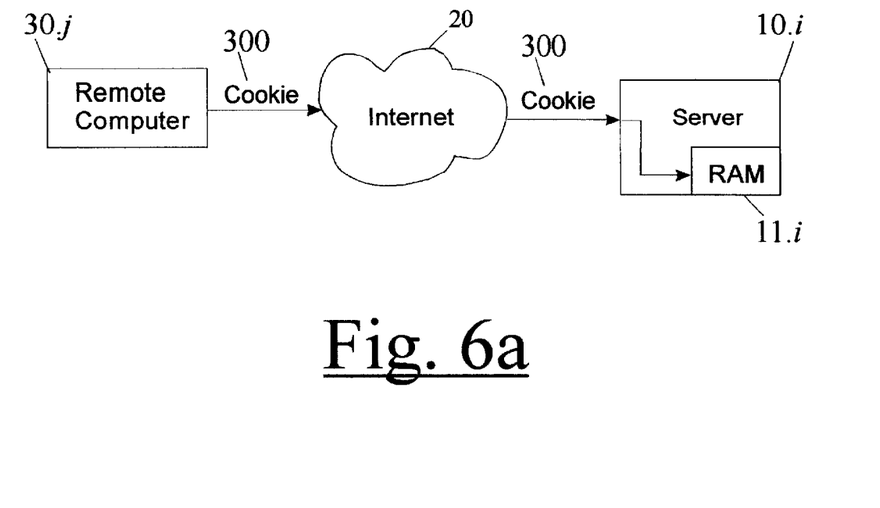
FIG. 6a shows a remote computer sending a cookie over the Internet to a first server.

As shown in FIG. 6a, a user's remote computer 30.j may send a cookie 300 back to server 10.i that originally sent the cookie 30.j to the user's computer 30.j, for storage of the cookie 30.j in server memory 11.i for subsequent processing.

Figure 6B:
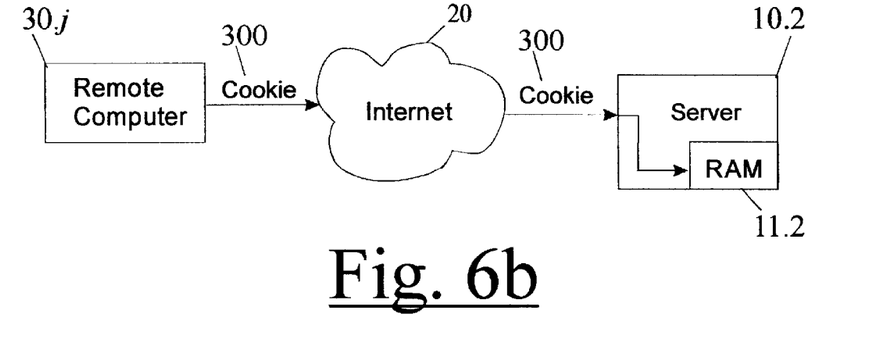
FIG. 6b shows a remote computer sending a cookie over the Internet to a second server.

As shown in FIG. 6b, a user's remote computer 30.j may send a cookie 300 to a server 10.2, which is not the server that originally sent the cookie 300 to the user's computer 30.j. As also shown FIG. 6b, server 10.2 stores cookie 30.j in server memory 11.2 for subsequent processing.

Once the value of the cookie is accessed, the key or reference data may be extracted, with reference data being used to obtain the original key when applicable. The original key is used to decrypt the encrypted private data by inputting the key and the encrypted private data into the particular encryption function employed.

Figure 7A:
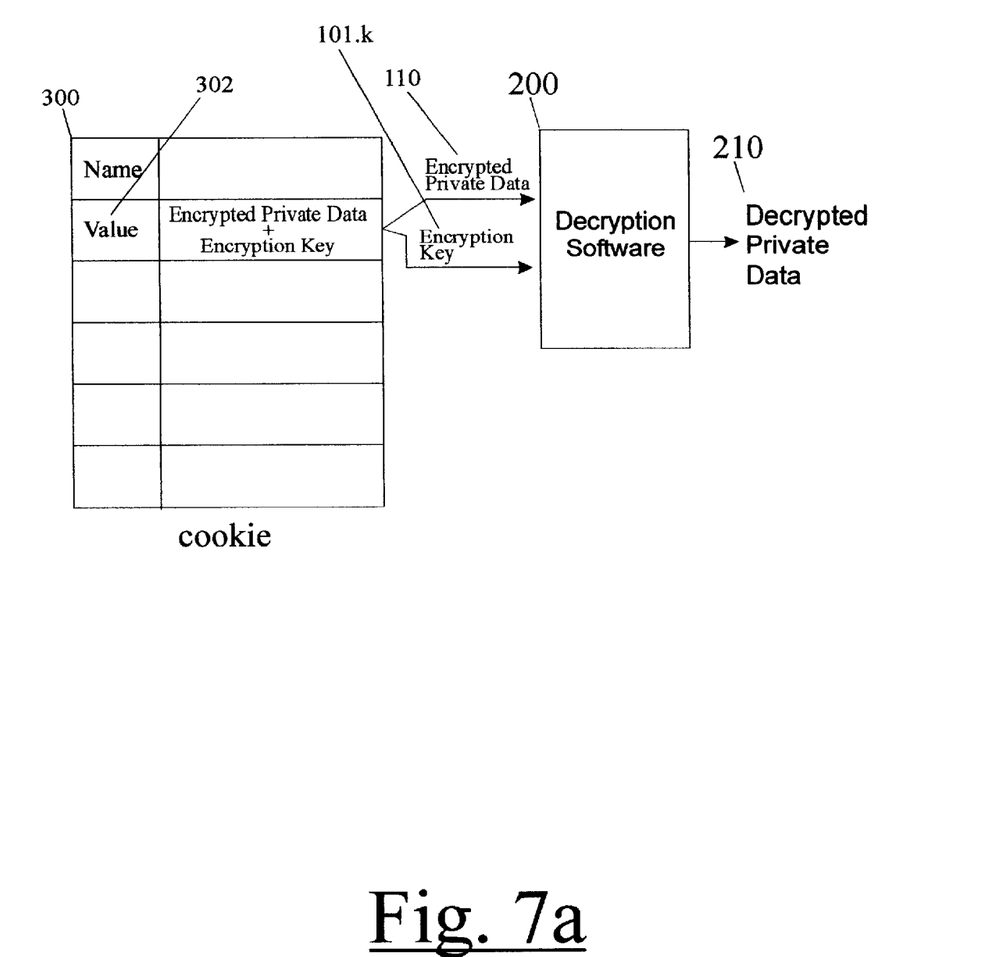
FIG. 7a shows encrypted private data and the respective cryptographic key extracted from the value field of a cookie and used to decrypt the encrypted private data.

As shown in FIG. 7a, in an exemplary aspect of the invention, from the value field 302 of a cookie 300 the encrypted private data 110 and associated encryption key 101.k are inputted into decryption function 200, which provides decrypted private data 210.

Figure 7B:
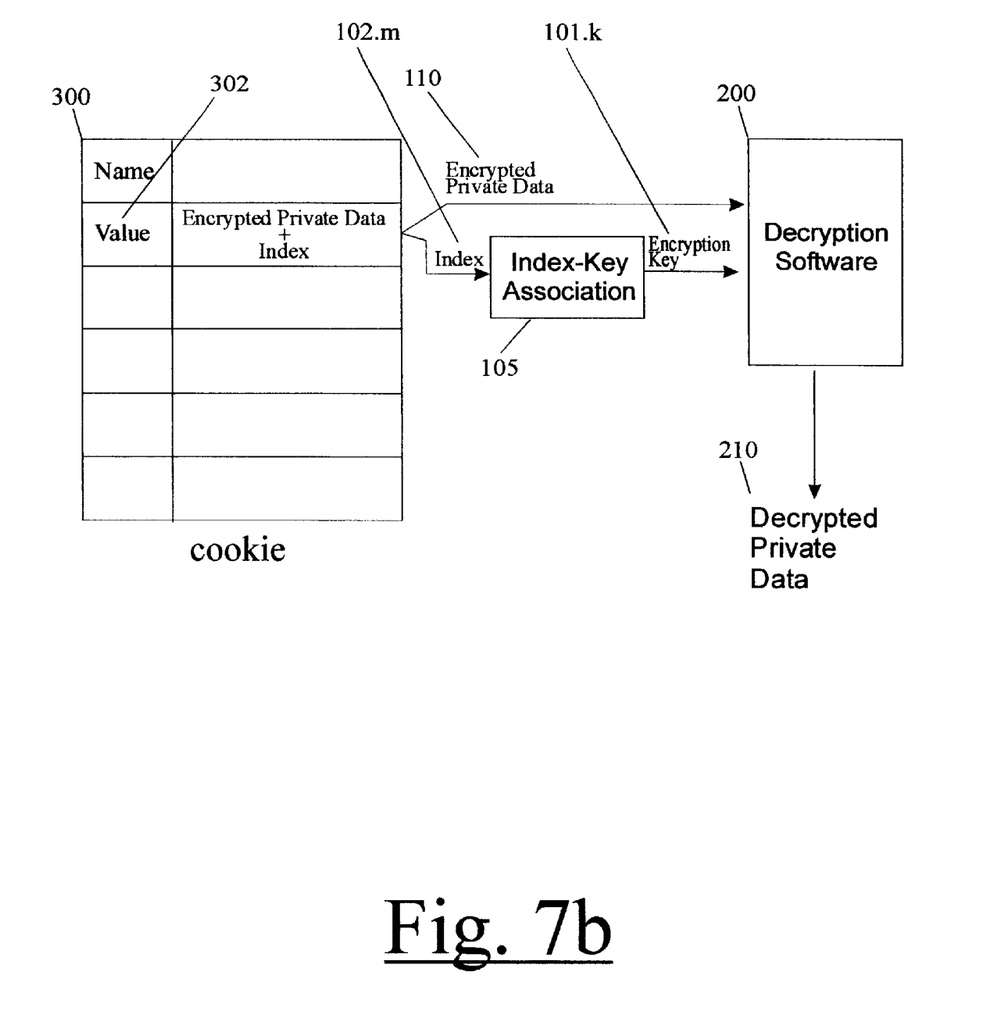
FIG. 7b shows encrypted private data and an index to the respective cryptographic key extracted from the value field of a cookie and used to decrypt the encrypted private data.

As shown in FIG. 7b, in an alternative aspect of the invention, from the value field 302 of a cookie 300 the encrypted private data 110 and reference data 102.m are extracted, with the reference data 102.m used to obtain the associated encryption key 101.k (e.g., via an Index-Key Association 105). The encrypted private data 110 and encryption key 101.k may then be utilized with decryption function 200 to produce as output decrypted private data 210.

Thus, with decrypted private data 210, a state may be created between the server and the remote computer of a user. For example, the decrypted data may be the user's last name, such as "Gossage" wherein the server may now know the identity of the user; thus creating a state between the server and the user.

As can be seen, the present invention efficiently protects the privacy of Internet users by protecting private user data available for establishing Internet user states.

In the foregoing specification, the invention has been described with reference to specific exemplary embodiments thereof. It will, however, be evident that various modifications and/or changes may be made thereto without departing from the broader spirit and scope of the invention. For example, where the size of a user key, as submitted by a user, is equal to the size required of an encryption key, the user key may be used directly as an encryption key. Accordingly, the specification and drawings are to be regarded in an illustrative and enabling rather than a restrictive sense.

Therefore, we claim:

1. In a system comprising a server and a computer communicatively connected together via an HTTP-based network, a method of establishing by the server a secure state between the server and a user operating the computer, said method comprising:

encrypting, using a cryptographic key, user data;

embedding, into the encrypted user data, key data comprising one of the cryptographic key and reference data associated with the cryptographic key;

storing, in a cookie, the encrypted user data having the key data embedded therein;

naming the cookie by storing name data in the cookie;

sending the cookie to the computer for storage thereby;

receiving the cookie from the computer;

extracting, from the cookie, the encrypted user data having the key data embedded therein;

extracting, from the encrypted user data having the key data embedded therein, the encrypted user data and said key data;

decrypting, using said key data, the encrypted user data; and establishing the secure state between the server and the user based on the decrypted user data.

2. The method of claim 1, further comprising before said encrypting, receiving user information from the computer;

wherein the user data is based on the user information.

3. The method of claim 1, wherein said key data comprises the cryptographic key, and decrypting the encrypted user data comprises decrypting, using the cryptographic key, the encrypted user data.

4. The method of claim 1, wherein the key data comprises reference data, and decrypting the encrypted user data comprises obtaining, with the reference data, the cryptographic key, and decrypting, using the cryptographic key, the encrypted user data.

5. The method of claim 4, further comprising storing the cryptographic key in a memory;

wherein the reference data is one of an index and a pointer, and obtaining the cryptographic key comprises accessing, using the reference data, the cryptographic key from the memory.

6. In a system comprising a server and a computer communicatively connected together via an HTTP-based network, a method of establishing by the server a secure state between the server and a user operating the computer, said method comprising:

receiving, from the computer, a cookie comprising encrypted user data having key data embedded therein;

extracting, from the cookie, the encrypted user data and the key data;

decrypting, using said key data, the encrypted user data; and establishing the secure state between the server and the user based on the decrypted user data.

7. The method of claim 6, wherein the key data comprises a cryptographic key, and decrypting the encrypted user data comprises decrypting, using the cryptographic key, the encrypted user data.

8. The method of claim 6, wherein the key data comprises reference data, and decrypting the encrypted user data comprises obtaining, with the reference data, a cryptographic key, and decrypting, using the cryptographic key, the encrypted user data.

9. The method of claim 8, wherein the reference data is one of an index and a pointer, the server comprises a memory containing a cryptographic key stored in association with the one of an index and a pointer, and obtaining the cryptographic key comprises accessing, using the reference data, the cryptographic key from the memory.

10. For use in a server communicatively connected with a computer via an HTTP-based network, a computer readable medium comprising instructions for establishing a secure state between the server and a user operating the computer, by causing the server to perform the actions of:

encrypting, using a cryptographic key, user data;

embedding, into the encrypted user data, key data comprising one of the cryptographic key and reference data associated with the cryptographic key;

storing, in a cookie, the encrypted user data having the key data embedded therein;

naming the cookie by storing name data in the cookie;

sending the cookie to the computer for storage thereby;

receiving the cookie from the computer;

extracting, from the cookie, the encrypted user data having the key data embedded therein;

extracting, from the encrypted user data having the key data embedded therein, the encrypted user data and said key data;

decrypting, using said key data, the encrypted user data; and establishing the secure state between the server and the user based on the decrypted user data.

11. The computer readable medium of claim 10, wherein the actions further comprise:

before said encrypting, receiving user information from the computer;

wherein the user data is based on the user information.

12. The computer readable medium of claim 10, wherein said key data comprises the cryptographic key, and decrypting the encrypted user data comprises decrypting, using the cryptographic key, the encrypted user data.

13. The computer readable medium of claim 10, wherein the key data comprises reference data, and decrypting the encrypted user data comprises obtaining, with the reference data, the cryptographic key, and decrypting, using the cryptographic key, the encrypted user data.

14. The computer readable medium of claim 13, wherein the actions further comprise:

storing the cryptographic key in a memory;

wherein the reference data is one of an index and a pointer, and obtaining the cryptographic key comprises accessing, using the reference data, the cryptographic key from the memory.

15. For use in a server communicatively connected with a computer via an HTTP-based network, a computer readable medium comprising instructions for establishing a secure state between the server and a user operating the computer, by causing the server to perform the actions of:

receiving, from the computer, a cookie comprising encrypted user data having key data embedded therein;

extracting, from the cookie, the encrypted user data and the key data;

decrypting, using said key data, the encrypted user data; and establishing the secure state between the server and the user based on the decrypted user data.

16. The computer readable medium of claim 15, wherein the actions further comprise:

before said encrypting, receiving user information from the computer;

wherein the user data is based on the user information.

17. The computer readable medium of claim 15, wherein said key data comprises the cryptographic key, and decrypting the encrypted user data comprises decrypting, using the cryptographic key, the encrypted user data.

18. The computer readable medium of claim 15, wherein the key data comprises reference data, and decrypting the encrypted user data comprises obtaining, with the reference data, the cryptographic key, and decrypting, using the cryptographic key, the encrypted user data.

19. The computer readable medium of claim 18, wherein the actions further comprise:

storing the cryptographic key in a memory;

wherein the reference data is one of an index and a pointer, and obtaining the cryptographic key comprises accessing, using the reference data, the cryptographic key from the memory.

* * * * *